No. 884,194. PATENTED APR. 7, 1908.
P. McGRATH.
STREET RAILWAY SWITCH.
APPLICATION FILED JULY 11, 1907.
6 SHEETS—SHEET 2.
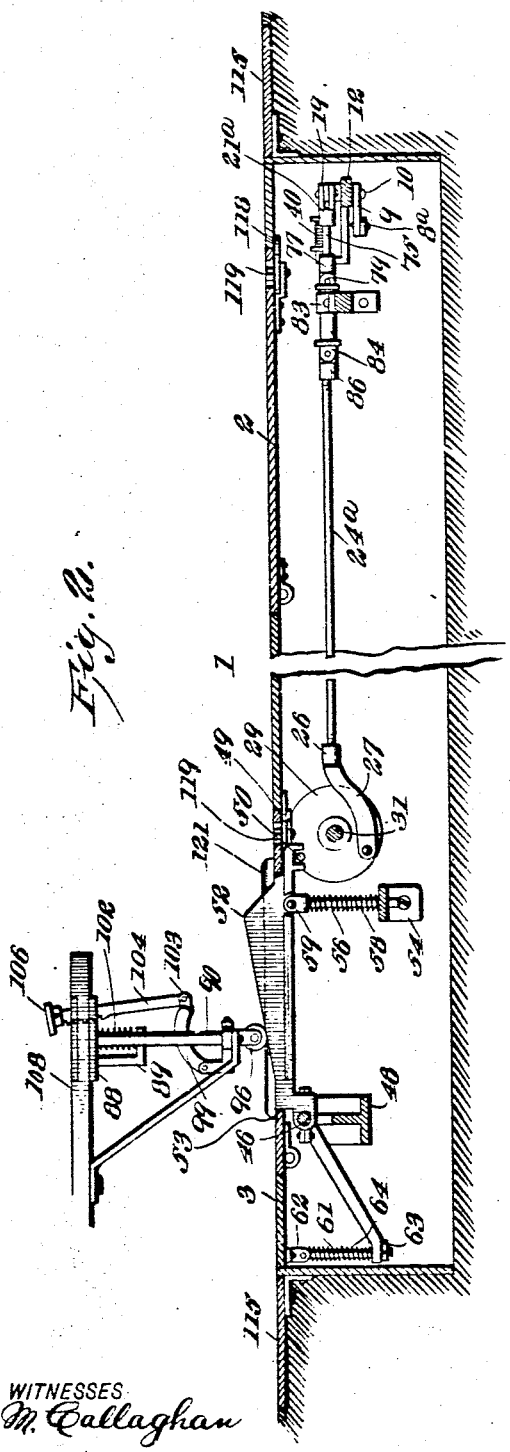
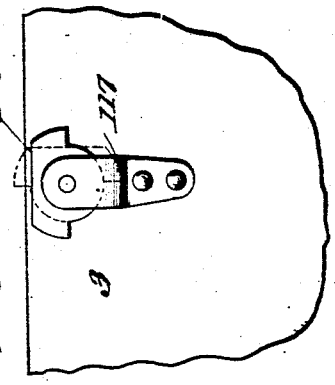
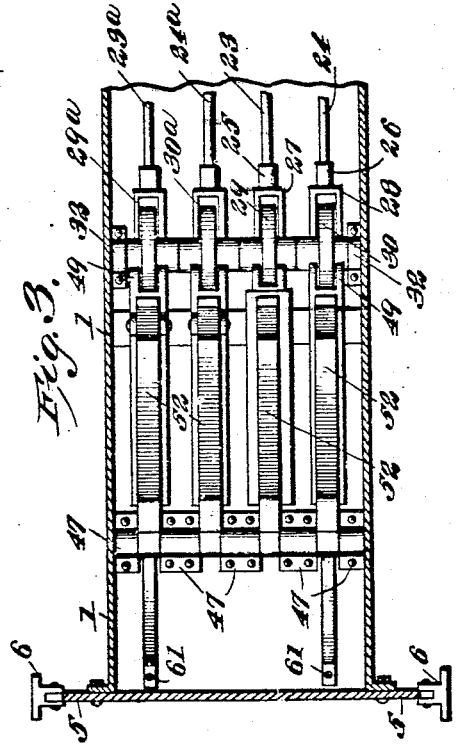
WITNESSES
E. M. Callaghan
C. E. Trainor
INVENTOR
PETER McGRATH
BY Munn & Co.
ATTORNEYS.

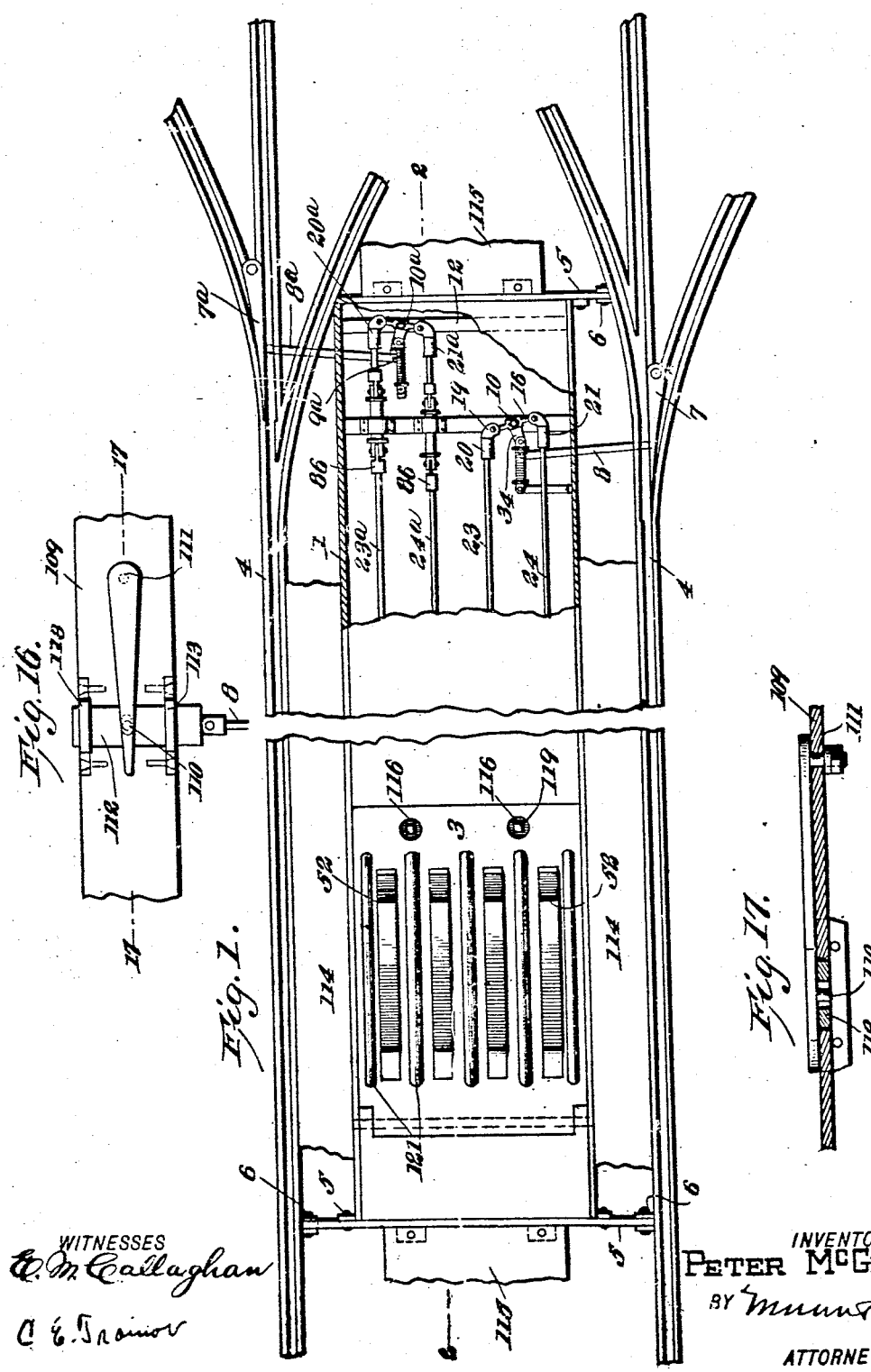

No. 884,194.
PATENTED APR. 7, 1908.
P. McGRATH.
STREET RAILWAY SWITCH.
APPLICATION FILED JULY 11, 1907.
6 SHEETS—SHEET 3.
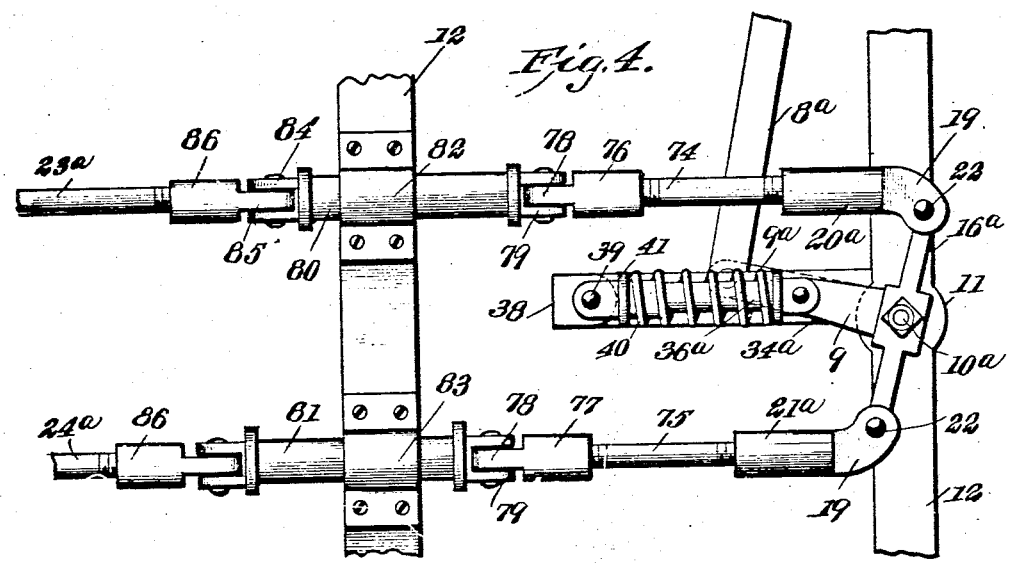
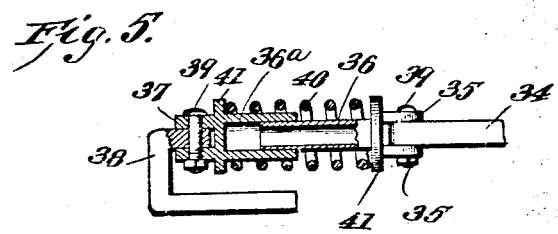
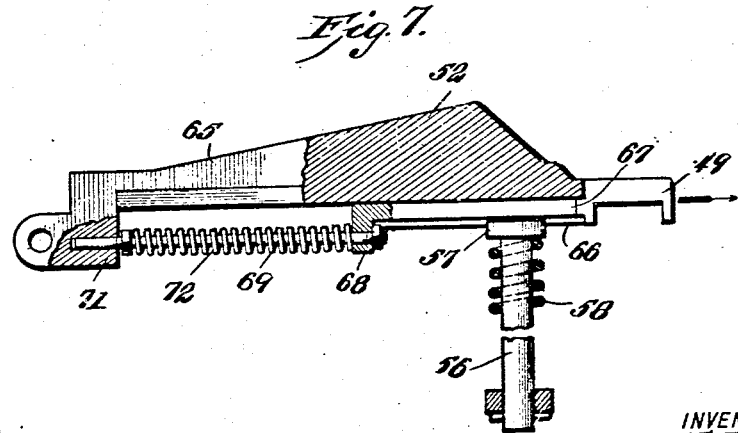
WITNESSES
E. N. Callaghan
C. E. Trainor
INVENTOR
PETER McGRATH
BY Munn & Co.
ATTORNEYS No. 884,194. PATENTED APR. 7, 1908.
P. McGRATH.
STREET RAILWAY SWITCH.
APPLICATION FILED JULY 11, 1907.
6 SHEETS—SHEET 4.
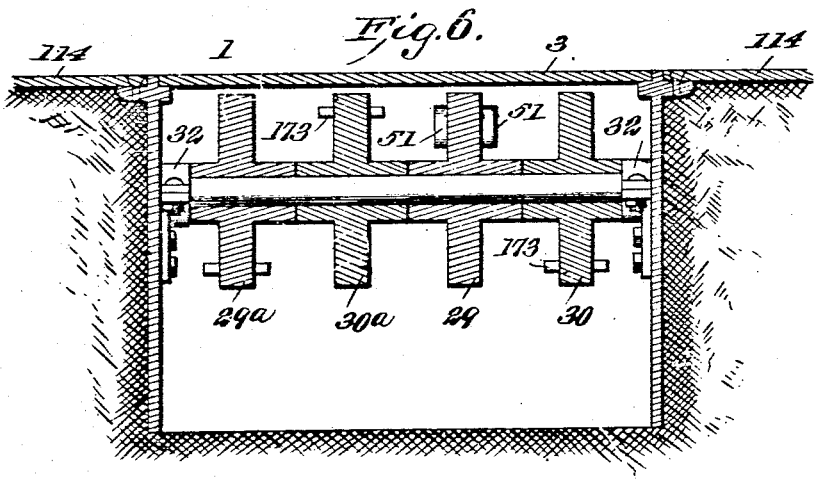
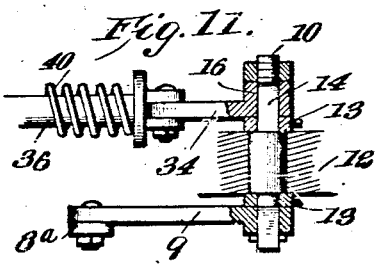
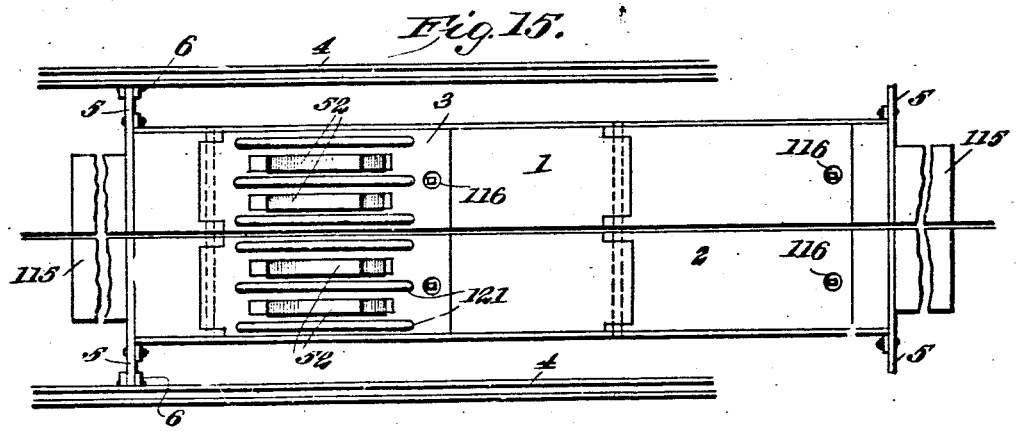
WITNESSES
E. M. Callaghan
C. E. Tranor
INVENTOR
PETER McGRATH
BY Munn & Co.
ATTORNEYS No. 884,194. PATENTED APR. 7, 1908.
P. McGRATH.
STREET RAILWAY SWITCH.
APPLICATION FILED JULY 11, 1907.
6 SHEETS—SHEET 5.
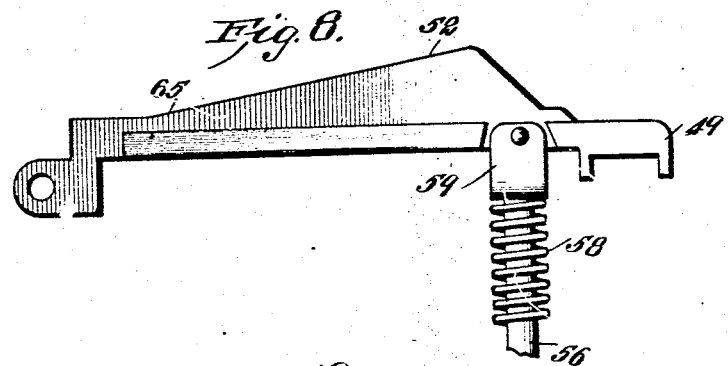
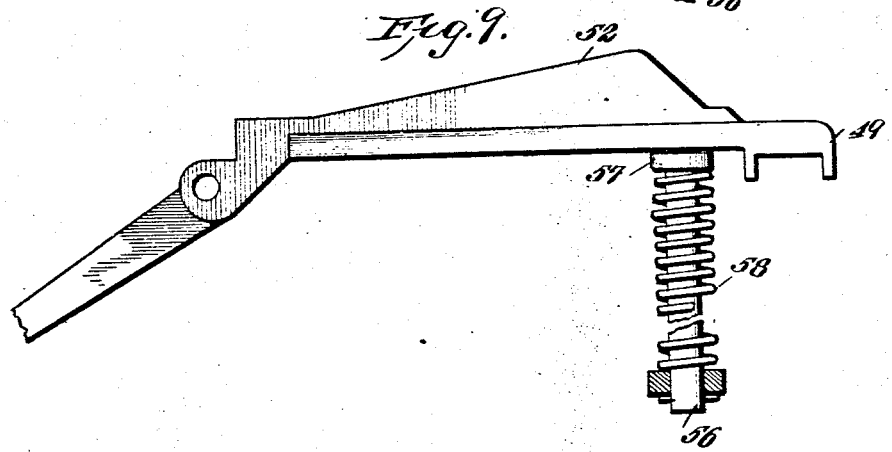
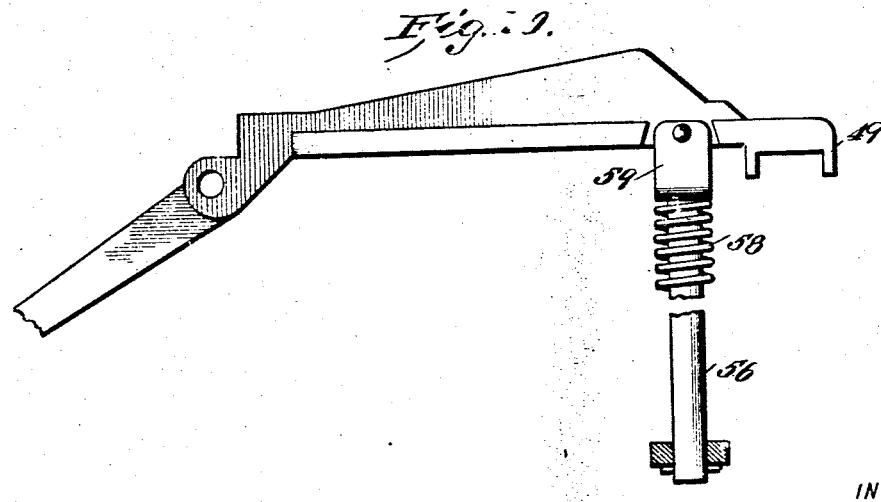
WITNESSES
INVENTOR
PETER McGRATH
BY
ATTORNEYS No. 884,194. PATENTED APR. 7, 1908.
P. McGRATH.
STREET RAILWAY SWITCH.
APPLICATION FILED JULY 11, 1907.
6 SHEETS—SHEET 6.
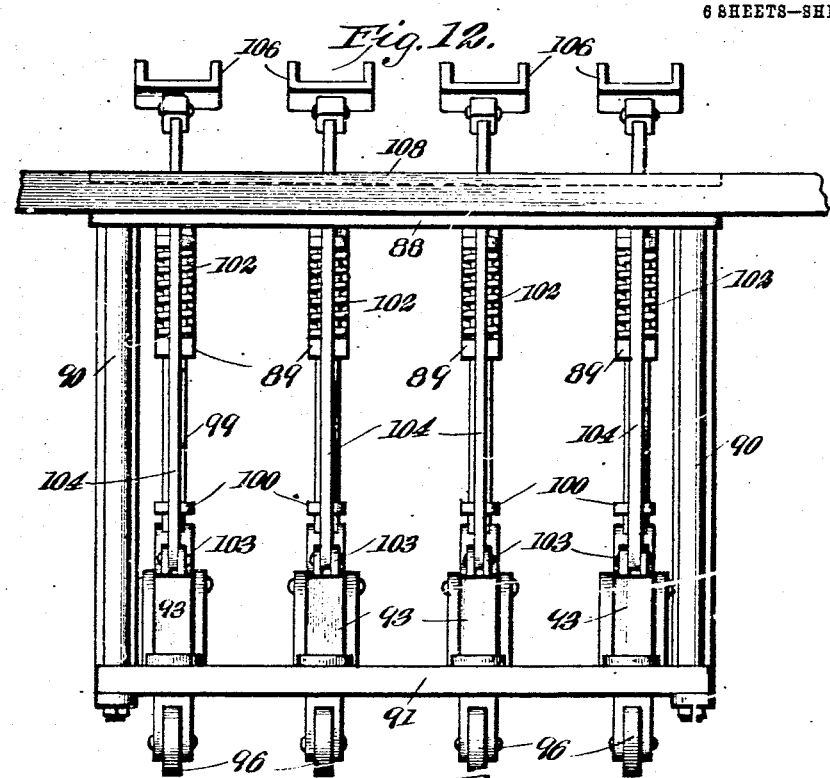
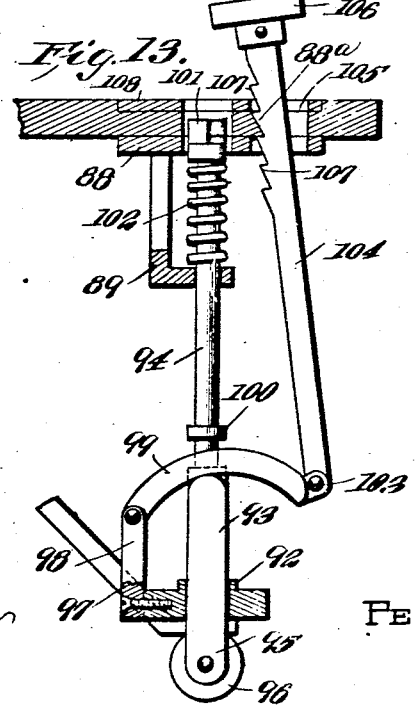
WITNESSES
E. M. Callaghan
C. E. Trainor
INVENTOR
PETER McGRATH
BY Munn & Co.
ATTORNEYS

UNITED STATES PATENT OFFICE.

PETER McGRATH, OF DENVER, COLORADO.

STREET-RAILWAY SWITCH.

No. 884,194.     Specification of Letters Patent.     Patented April 7, 1908.

Application filed July 11, 1907. Serial No. 383,264.

*To all whom it may concern:*

Be it known that I, PETER McGRATH, a citizen of the United States, and a resident of Denver, in the county of Denver and State of Colorado, have made certain new and useful Improvements in Street - Railway Switches, of which the following is a specification.

My invention is an improvement in street railway switches and consists in certain novel constructions and combinations of parts hereinafter described and claimed.

Referring to the drawings forming a part hereof—Figure 1 is a plan view of my improvement, parts thereof being broken away. Fig. 2 is a section on the line 2—2 of Fig. 1. Fig. 3 is a partial horizontal section. Fig. 4 is a detail plan view of a part of the operating mechanism of the second switch. Fig. 5 is a detail sectional view of the telescoping shaft and spring for retaining the switch points in position. Fig. 6 is a vertical transverse section through the disks. Fig. 7 is a side view of one of the swinging levers partly in section. Figs. 8, 9 and 10 are similar views of other modifications. Fig. 11 is a sectional view of the operating shaft. Fig. 12 is a front view of the operating mechanism on the car. Fig. 13 is a side view of one of the shafts and the operating mechanism therefor. Fig. 14 is a detail plan view of the lock for the doors. Fig. 15 is a plan view of a modified form adapted for use with underground conduits. Fig. 16 is a detail of the mounting of the switch point, and Fig. 17 is a section on the line 17—17 of Fig. 16.

In the present embodiment of my invention, the mechanism is inclosed in a substantially rectangular casing 1, the top of the casing being closed by doors 2, 3. The top of the casing is flush with the rails 4 on the main line, and the ends of the casing are extended as at 5, and secured to the webs of the rails as at 6.

The switch point 7 is operatively connected to one end of a link 8, the other end of the link being pivoted to a crank arm 9, on a vertical shaft 10, journaled in bearings 11, on a cross bar 12 arranged between the side members of the frame. The shaft 10 is provided with collars 13 above and below the bearing, whereby to prevent longitudinal movement through the bearing, and the upper end of the shaft is squared as at 14, and shoulders 15 are provided between the squared portion and the cylindrical portion of the shaft. A lever 16 is provided with a central opening corresponding in cross section to the square portion of the shaft and fitting thereover, the lever being supported by the shoulders and secured in place by a nut 18. The ends of the levers 16 are received between spaced lugs 19 of integrally threaded sockets 20 and 21, and bolts 22 traverse the lugs and the ends of the lever. Rods 23, 24, are threaded into the sockets 20, 21, and the opposite ends of the rods are threaded into sockets 25, 26, each of said sockets being provided with curved parallel arms 27, 28, which are pivotally connected to the opposite faces of the disks 29, 30, journaled on a shaft 31 journaled in bearings 32, secured to the side members of the casing.

It will be evident from the description, that when one of the disks 29, for instance, is rotated in one direction, the lever 16 will be operated to oscillate the shaft 10, whereby to move the switch point in one direction, and that the operation of the lever through the rod 24 will oscillate the other disk 30 in the opposite direction.

The lever 16 has connected with the center thereof a crank arm 34, which is received between lugs 35 on one of the members 36 of a telescoping shaft, the other member 36ª being provided with lugs 37, which receive between them the end of a bracket 38, and bolts 39 connect the lugs 37 and the bracket 38 and also the lugs 35 and the crank arm 34. A spring 40 encircles the telescoping shaft, and each member of the said shaft is provided with an annular shoulder 41, adjacent to the lugs against which the ends of the spring bear.

A mechanism is provided for oscillating each of the disks, the said mechanism comprising a swinging lever 43, 44, for each disk, the said levers being pivoted at 45 to a rod 46 arranged transversely of the casing, and supported by a plurality of bearings 47, connected with a cross bar 48 arranged between the side members. The end of the swinging lever 43 adjacent to the shaft, is forked as at 49, for receiving the edge of the disk therebetween, and the lower faces of each of the arms of the fork is notched as at 50, for engaging segmental plates 51, secured upon each face of the disk. The upper face of each of the swinging levers is provided with a cam-shaped surface 52, projecting upward through a slot 53 in the door 3 of the casing, and is adapted to be engaged by mechanism on the car to be presently described, whereby to swing the swinging lever downward and oscillate the disk on the shaft.

Adjacent to the shaft upon which are journaled the disks, is a cross bar 54, provided with a plurality of vertical openings therethrough, and slidable in the openings are rods 56, having their upper ends headed as at 57, and a spring 58 is arranged between the head of each rod and the cross bar. The head 57 of the rod 56 is immediately beneath the swinging lever 43, in position for engagement by the lever when it is depressed by the operating mechanism, so that the swinging downward of the lever will compress the spring, and when the pressure on the cam-shaped surface is released the spring will elevate the swinging lever.

If desired, the rod 56 may be provided with a yoke 59, within which the swinging lever is received, the arms of the yoke being pivoted to the sides of the lever. The swinging lever may also have an extended end opposite the rod from the disks, and the said extended end may be provided with an opening 60, through which passes a rod 61 pivoted to a bracket 62 on the upper face of the casing, and provided with a nut 63 below the extended end of the lever, a spring 64 being arranged between the extended end and the bracket.

In Fig. 7, I have shown a modified form of swinging lever, comprising a portion 65 pivoted by one end to the rod before described, and having on its lower face at its opposite end a slideway 66, in which is mounted the other portion 67, the said portion being provided with the fork 49 before described. The portion 67 is provided with a lug 68, through which slides a rod 69, having one of its ends connected with the bearing 71 of the swinging lever, and a spring 72 is arranged between the lug 68 and the bearing 71. The segmental plates 51 may also be dispensed with, and replaced by a pin 173 traversing the disk and projecting upon each face thereof.

The mechanism just described is adapted for operating a switch point upon one side of a track, but for operating the switch point on the opposite side of the track, which is generally placed at some little distance from the other switch point, additional mechanism is provided. A shaft 10ª, similar in all respects to the shaft 10 before described, is journaled in a cross bar 12ª arranged between the side members of the casing, and is connected up to the switch point 7ª by a similar mechanism, comprising the link 8ª and the crank 9ª. A similar lever 16ª is connected with the upper end of the shaft in precisely the same manner as the lever 16 before described, and threaded sockets 20ª, 21ª are connected to the opposite ends of the lever. Rods 74, 75 are threaded into the sockets 21, 21ᵇ, by one end, and the other ends are threaded into sockets 76, 77, the said sockets each being provided with a lug 78 received between ears 79, on the ends of rods 80, 81, slidable through bearings 82, 83 in the cross bar 12, before described, and the opposite ends of the rods 80, 81, are provided with ears 84, between which are received lugs 85, on sockets 86, 86, into which are threaded the ends of the rods 23ª, 24ª, corresponding to the rods 23, 24, before described, and connected to disks 29ª, 30ª, similar in all respects to the disks 29, 30, and journaled on the shaft 31. The disks are operated by swinging levers 43 in the same manner as the disks 29, 30. The upper end of the shaft 10ª is provided with a crank arm 34ª, to which is connected one of the members 36ª of a telescoping shaft, similar in all respects to the mechanism before described in connection with the other shaft 10. The object of the telescoping shaft with the spring between the members thereof, is to throw the shafts 10, 10ª, past the center and to properly retain the switch point in whichever position it is moved.

In Figs. 2, 12 and 13, I show the mechanism connected with the car for operating the swinging levers, the said mechanism comprising a plate 88 secured to the bottom of the platform, having integral therewith four depending brackets 89. Rods 90 extend downward from each end of the plate 88, and secured to the lower ends of the rods is a cross bar 91, provided with four spaced square openings 92 therethrough, each of said openings being adapted to receive the square portion 93 of a vertically slidable shaft 94, the lower end of the shaft being provided with ears 95 in which is journaled a roller 96. Each of the four shafts 94, is similar in construction and only one will be described. Brackets 97 are secured to the front of the cross bar at spaced intervals, and the upper free edge of each bracket is provided with a plurality of spaced notches 98, and within each notch is pivotally mounted one end of a segmental lever 99, the said levers being arranged in pairs, and each pair having their free ends connected together. The shaft 94, has its upper end reduced and made cylindrical, and this cylindrical portion is received between a pair of arms, segmental shoulders being formed on the shaft between the square portion and the cylindrical portion, upon which the lower edges of the arms bear. A collar 100 is arranged on the shaft above the arms, and the upper end of the shaft is headed as at 101, a spring 102 being arranged between the head of the shaft and the bracket 89 before mentioned, the lower end of the bracket being provided with an opening for receiving the cylindrical portion of the shaft. The connected ends of each pair of segmental levers 94, is provided with spaced ears 103, and between the ears is pivoted the lower end of a vertically sliding bar 104, movable through an opening 105 in the plate 88 before mentioned, and provided on its upper end with a treadle 106, by means of which a motorman may operate the shaft with his foot. One of the edges of the bar 104 is provided with a plurality of notches 107, adapted to engage beneath a catch 88ª, for retaining the shaft in its lowered position. Plates 108 are arranged upon the upper surface of the platform, the said plates being provided with openings as shown corresponding to the openings in the lower plate. It will be understood from the description, that when the motorman desires to throw the switch, he will depress the shaft 94 corresponding to the swinging lever, which he wishes to operate, and as the car passes over the said lever it will be depressed, whereby to oscillate the corresponding disk to swing the vertical shaft and throw the switch point.

In Figs. 16 and 17 is shown the preferred manner of connecting the switch point with the crank arms. A plate 109 is arranged beneath the switch point, and the said point is provided with integral pins 110, 111, one of said pins being received in an opening in the plate 109, and the other in an opening in a plate 112 slidable transversely of the plate 109, the said plate being cut away to receive the plate 112, and being provided with bearings 113 at each end of the cut away portion for retaining the said plate in place. The link 8, before described, is pivotally connected with the end of the plate 112.

Plates 114 are arranged between the side members of the casing and the rails, to inclose the space therebetween, and additional plates 115 are connected with the ends of the casing, the upper surface of the said plates being flush with the upper surface of the casing, and extending in each direction therefrom, whereby to afford a riding surface for the rollers in the lower ends of the shafts 94. Each of the doors 2, 3, is provided with a plurality of locks 116, each of said locks comprising a disk pivoted by its center between the door and a bracket 117 on the lower face thereof, a portion of the disk being cut away as at 118, to permit the disk to pass the door when the cut away portion is in the proper position. The upper end of the pivot upon which the disk turns is squared as at 119, for receiving a key, and the squared portion may have an opening therethrough to permit the insertion of an instrument, whereby to lift the door. The door covering the swinging levers as before stated, is provided with slots through which the cam-shaped portion of the levers pass, and between each of the slots is a ridge 121, of approximately the height of the cam-shaped portion of the lever to protect the levers from vehicle wheels crossing the track, and to prevent depression of the swinging levers by such vehicle wheels.

In Fig. 15, is shown a modification especially adapted for underground trolley roads. In the modification, the casing is divided into two portions, one upon each side of the slot, and a single operating shaft is contained in each casing. Otherwise the construction is precisely the same as in the form first described, and operates in the same manner.

I claim—

1. The combination with the switch point, of means for operating the same comprising a casing, a vertical shaft within the casing, said shaft being provided with a crank arm at its lower end, a connection between the crank arm and the switch point whereby the oscillation of the shaft will move the point, a lever connected by its center to the upper end of the shaft, a shaft arranged transversely of the casing, a plurality of disks journaled on the shaft, a link connecting each end of the lever with one of the disks, whereby the oscillation of the disks will oscillate the shaft, pins traversing the disk near the periphery thereof and projecting upon each side, swinging levers having one end forked to receive the disk, the lower edges of the forked portion being notched to engage the pins, said levers having cam-shaped surfaces projecting above the casing, springs for supporting said swinging levers, means on a moving car for engaging the cam-shaped surface of either of the levers to depress the same whereby to oscillate the corresponding disk, and yielding means in connection with the shaft for retaining the switch point in the position into which it is moved.

2. The combination with the switch point, of means for operating the same comprising a casing, a vertical shaft journaled in the casing and provided with a crank arm at its lower end, a connection between the crank arm and the point, a shaft arranged transversely of the casing, a pair of disks journaled on the shaft, a connection between the shaft and the disks, whereby the oscillation of one of the disks to move the shaft will oscillate the other disk in the opposite direction, pins traversing the disk near the periphery thereof and projecting upon each side, swinging levers having one end forked to receive the disk, the lower edges of the forked portion being notched to engage the pins, said levers having cam-shaped surfaces projecting above the casing, springs for supporting the levers, means on a moving car for engaging the cam-shaped surface of either of the levers to depress said lever, and means in connection with the shaft for retaining the switch point in the position into which it is moved.

3. The combination with the switch point, of means for operating the same comprising a casing, a vertical shaft journaled within the casing, a connection between the shaft and the switch point whereby the oscillation of the shaft will move said point, a shaft journaled transversely of the casing, a plurality of disks journaled on the transverse shaft, a connection between the vertical shaft and the disks whereby the oscillation of one disk to move the shaft will oscillate the other disk in the opposite direction, pins traversing the disks near the periphery thereof and projecting upon each side, swinging levers for engaging the pins to oscillate the disks, springs for supporting the levers, said levers having cam-shaped surfaces projecting above the casing, means on a moving car for engaging the cam-shaped surface of either of the levers to depress said lever, and means in connection with the shaft for retaining the switch point in the position into which it is moved.

4. The combination with the switch point, of means for operating the same comprising a casing, a vertical shaft journaled within the casing, a connection between the shaft and the switch point whereby the oscillation of the shaft will move the point, a plurality of disks journaled in the casing on a horizontal axis, a connection between each of the disks and the shaft, whereby the oscillation of one disk to move the shaft will oscillate the other disk in the opposite direction, a swinging lever in connection with each disk, each provided with a cam-shaped surface projecting above the casing, means on a moving car for engaging the cam-shaped surface of either of the levers, whereby to depress the same, a connection between the levers and the respective disks whereby the depression of the lever will oscillate the disk, springs for supporting the levers and means in connection with the vertical shaft for retaining the switch point in the position into which it is moved.

5. The combination with the switch point, of means for operating the same comprising a vertical shaft, a connection between the shaft and the switch point whereby the oscillation of the shaft will move the point, a plurality of disks journaled on a horizontal axis, a connection between each of the disks and the shaft, whereby the oscillation of one disk to move the shaft will oscillate the other disk in the opposite direction, swinging levers each provided with a cam-shaped surface, means on a moving car for engaging the cam-shaped surface of either of the levers whereby to depress the same, a connection between the levers and the respective disks whereby the depression of the lever will oscillate the disk, and means in connection with the vertical shaft for retaining the switch point in the position into which it is moved.

6. The combination with the switch point, of means for operating the same comprising a vertical shaft, a connection between the shaft and the switch point whereby the oscillation of the shaft will move the point, a plurality of disks journaled on a horizontal axis, a connection between each of the disks and the shaft whereby the oscillation of one of the disks to move the shaft will oscillate the other disk in the opposite direction, a swinging lever in connection with each disk, each of said levers being provided with a cam-shaped surface and having a connection with the disk whereby the depression of the lever will oscillate the disk in one direction, and means on a moving car for engaging the cam-shaped surface of either of the levers to depress said lever.

7. The combination with the switch point, of a plurality of disks journaled on a horizontal axis, a connection between each of the disks and the switch point, whereby the oscillation of one of the disks to move the point will oscillate the other disk in the opposite direction, levers mounted for swinging movement and provided with a cam-shaped surface on their upper faces, a connection between the levers and the disk whereby the depression of the levers will oscillate the corresponding disk, and means on a moving car for engaging the cam-shaped surface of either for engaging the levers, whereby to depress said lever.

8. The combination with the switch point, of a plurality of disks journaled on a horizontal axis, a connection between each of the disks and the switch point, whereby the oscillation of one of the disks to move the point will oscillate the other disk in the opposite direction, levers mounted for swinging movement and provided with a cam-shaped surface on their upper faces, a connection between the levers and the disks whereby the depression of a lever will oscillate the corresponding disk, means on a moving car for engaging the cam-shaped surface of either of the levers whereby to depress the same, and means in connection with the point for retaining it in the position into which it is moved.

9. The combination with the switch point, of means for operating the same comprising a vertical shaft, a connection between the shaft and the switch point whereby the oscillation of the shaft will move the point, a plurality of swinging levers each having a cam-shaped upper surface, means on a moving car for engaging the cam-shaped surface of either of the levers whereby to depress the same, and a connection between the levers and the shaft, whereby the depression of one of said levers will oscillate the shaft in one direction, and whereby the depression of the other lever will oscillate the shaft in the opposite direction.

10. The combination with the switch point, of means for operating the same comprising a vertical shaft, a connection between the shaft and the switch point whereby the oscillation of the shaft will move the point, a plurality of swinging levers each provided with a cam-shaped upper surface, means on a moving car for engaging the cam-shaped surface of either of the levers, whereby to depress the same, a connection between the levers and the shaft whereby the depression of one of the levers will oscillate the shaft in one direction and the depression of the other lever will oscillate the shaft in the opposite direction, and yielding means in connection with the shaft for retaining the switch point in the position into which it is moved.

11. The combination with the switch point, of means for operating the same comprising a vertical shaft, a connection between the shaft and the switch point whereby the oscillation of the shaft will move the point, a plurality of swinging levers each provided with a cam-shaped upper surface, means on a moving car for engaging the cam-shaped surface of either of the levers, whereby to depress the same, and a connection between the levers and the shaft whereby the depression of one of the levers will oscillate the shaft in one direction and the depression of the other lever will oscillate the shaft in the opposite direction.

12. The combination with the switch point, of means for operating the same comprising a vertical shaft, a connection between the shaft and the switch point whereby the oscillation of the shaft will move the point, swinging levers in connection with the shaft, means whereby the depression of one lever will oscillate the shaft in one direction, and whereby the depression of the other lever will oscillate the shaft in the opposite direction, springs for supporting the levers, means on a moving car for engaging the levers to depress the same, and yielding means in connection with the vertical shaft for retaining the switch point in the position into which it is moved.

13. The combination with the switch point, of means for operating the same comprising a vertical shaft, a connection between the shaft and the switch point whereby the oscillation of the shaft will move the point, swinging levers connected with the shaft, means whereby the depression of one lever will oscillate the shaft in one direction, and whereby the depression of the other lever will oscillate the shaft in the opposite direction, springs for supporting the levers, and means on a moving car for engaging the levers to depress the same.

14. The combination with the switch point, of a plurality of levers mounted for swinging movement and provided with cam-shaped surfaces on their upper faces, means on a moving car for engaging the cam-shaped surface of either of the levers, whereby to depress said lever, means whereby the depression of one of the levers will move the point in one direction, and whereby the depression of the other lever will move the point in the opposite direction, springs for supporting the levers, and yielding means for retaining the switch point in the position into which it is moved.

15. The combination with the switch point, of means for operating the same comprising a vertical shaft, a connection between the shaft and the switch point whereby the oscillation of the shaft will move the point, swinging levers connected with the shaft, means whereby the depression of one lever will oscillate the shaft in one direction, and whereby the depression of the other lever will oscillate the shaft in the opposite direction, means on a moving car for engaging the levers to depress the same, and yielding means in connection with the vertical shaft for retaining the switch point in the position into which it is moved.

16. The combination with the switch point, of a plurality of disks journaled to oscillate on a horizontal axis, a connection between each of the disks and the switch point, whereby the oscillation of one of the disks to move the point will oscillate the other disk in the opposite direction, yieldingly mounted swinging levers for oscillating the disks, means on a moving car for operating the levers, and yielding means for retaining the switch point in the position into which it is moved.

17. The combination with the switch point, of a plurality of disks journaled to oscillate on a horizontal axis, a connection between each of the disks and the switch point, whereby the oscillation of one of the disks to move the point will oscillate the other disk in the opposite direction, yieldingly mounted swinging levers for operating the disks, and means on a moving car for operating the levers.

18. The combination with the switch point, of a plurality of rotatable disks, a connection between each of the disks and the switch point whereby the movement of one of the disks will move the point in one direction and whereby the movement of the other disk will move the point in the opposite direction, yieldingly mounted swinging levers for operating the disks, and means operated by a moving car for operating the levers.

19. The combination with the switch point, of a plurality of disks journaled in a horizontal axis, a connection between each of the disks and the switch point whereby the oscillation of one of the disks to move the point will oscillate the other disk in the opposite direction, levers pivoted at one end and having the other end forked to engage the sides of the disk, the lower edges of the forked portion being notched, pins on the faces of the disks for engaging the notches, springs for normally retaining the levers in inoperative position, and means whereby a moving car may engage either of the levers to depress the same.

20. The combination with the switch point, of a plurality of disks journaled on a horizontal axis, a connection between each of the disks and the switch point whereby the oscillation of one of the disks to move the point will oscillate the other disk in the opposite direction, levers for oscillating the disks, said levers comprising a portion mounted for swinging movement, and a portion slidable within said first-named portion, said last-named portion being provided with a forked end for engaging the disk, the lower edges of the forked portion being notched, said disk being provided with pins for engagement by the notches, and a spring connecting said portions together.

21. The combination with the switch point, of a plurality of disks journaled on a horizontal axis, a connection between each of the disks and the switch point whereby the oscillation of one of the disks to move the point will oscillate the other disk in the opposite direction, levers mounted for swinging movement, each of said levers comprising two portions, one of which is slidable in the other, one of said portions being pivoted by its free end, and the other being adapted to engage the disk when the lever is depressed to oscillate the disk, and means on a moving car for engaging the lever to depress the same.

22. The combination with the switch point, of means for operating said point, said means comprising a plurality of spring-supported depressible levers, each provided upon its upper face with a cam-shaped surface, and means on a moving car for engaging the cam-shaped surface of any of said levers, said means comprising a vertically movable shaft provided on its lower end with a roller for engaging the corresponding cam-shaped surface, means for elevating and depressing said lever, and means for retaining said lever in lowered position.

23. The combination with the switch point, of means for operating said point, comprising a plurality of spring supported levers, each provided on its upper face with a cam-shaped surface, and means on a moving car for engaging the cam-shaped surface of any of said levers, said means comprising a plurality of vertically movable shafts, rollers on the lower ends of the levers, springs for supporting the shafts, means whereby to depress either of the shafts, and means for retaining the shaft in its lowered position.

24. The combination with the switch point, of means for operating the same comprising a vertical shaft, a connection between the shaft and the switch point whereby the oscillation of the shaft will move the point, swinging levers connected with the shaft, means whereby the depression of one lever will oscillate the shaft in one direction, and whereby the depression of the other lever will oscillate the shaft in the opposite direction, and means on a moving car for engaging the levers to depress the same.

PETER McGRATH.

Witnesses:
S. C. KEMON,
J. MIDDLETON.